United States Patent Office 3,166,584
Patented Jan. 19, 1965

3,166,584
TETRACYANOETHYLENE
Theodore Le Sueur Cairns, Newark, and Edith Ann Graef, Wilmington, Del., assignors to E. I. du Pont de Nemours and Company, Wilmington, Del., a corporation of Delaware
No Drawing. Filed Sept. 28, 1953, Ser. No. 382,842
2 Claims. (Cl. 260—465.8)

This invention relates to a new polymerizable nitrile, polymers thereof, and the preparation thereof. This application is a continuation-in-part of applicants' copending application Serial No. 311,544, filed September 25, 1952, and now abandoned.

Certain cyano-substituted ethylenes, particularly acrylonitrile, maleonitrile and fumaronitrile, have received major attention both as chemical intermediates and as polymerizable monomers. Prior to the discovery on which this invention is based, however, no substituted ethylene has been prepared in which all four hydrogens in ethylene are replaced by cyano groups.

It has now been found that tetracyanoethylene, $(NC)_2C=C(CN)_2$, can be prepared by reaction of sulfur monochloride with malononitrile. It has also been found that this new substituted ethylene can be converted to polymeric materials.

While it is known that aliphatic esters of malonic acid react with sulfur monochloride to yield the corresponding esters of ethylene tetracarboxylic acid, other compounds more closely related to malononitrile, such as cyanoacetic esters, malonamides, and the half ester-half amides of malonic acid, react variously to yield dicyanosuccinic esters, dithioketones or do not react at all. Accordingly, it was not possible to predict from the art what product should result from the reaction of malononitrile with sulfur monochloride, the evidence indicating, if anything, the probable formation of alpha,beta-dicyanosuccinonitrile.

The reaction of sulfurmonochloride with malononitrile to form tetracyanoethylene can be carried out in the absence of a diluent, but a diluent is desirable to control the exothermic nature of the reaction. Suitable diluents include chloroform, carbon tetrachloride, tetrachloroethylene, benzene, toluene, and xylene. Water should be excluded.

The ratio of sulfur monochloride to malononitrile is not highly critical, but the molar ratio of these reactants should be kept within the range of 1:2 and 2:1, and preferably at 1:1, for best results. The reaction occurs slowly at temperatures as low as 25° C. It is advantageous, however, to operate in the range of 50° C. to 125° C.

The exact course of the reaction by which tetracyanoethylene is formed is not known, but the over-all reaction is believed to be somewhat as follows:

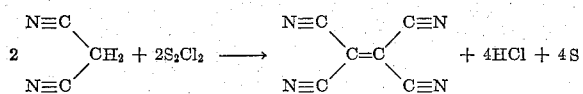

Tetracyanoethylene is a white crystalline solid which melts in a sealed tube at 195° C.–200° C. It sublimes when dropped on a melting block at 120° C.–150° C. Tetracyanoethylene is soluble in alcohol and acetone, sparingly soluble in water, chloroform, and diethyl ether, and essentially insoluble in petroleum ether (B.P. 30° C.–60° C.)

Tetracyanoethylene is chemically unique among the substituted ethylenes in that it is composed entirely of carbon and nitrogen. The structure of tetracyanoethylene, as indicated in the equation above, shows the very high degree of unsaturation possessed by this molecule. All this unsaturation occurs in conjugated positions, the terminal triple bonds being doubly conjugated with both of the triple bonds in the cyano groups which are attached to the opposite carbon of the central ethylene unit.

Tetracyanoethylene is a paradox insofar as properties are concerned. It is highly stable in the sense that it does not decompose at its high melting point and, even though it is a high melting solid, it is sufficiently volatile that it may be obtained in a high state of purity by sublimation. In spite of its high degree of unsaturation, it is not affected by oxygen at temperatures up to 200° C. nor does it add bromine, although ready absorption of bromine is a common criterion for determining the presence of ethylenic unsaturation. On the other hand, tetracyanoethylene is such a highly reactive chemical that it is almost impossible to dissolve it in any of the common organic solvents and recover it unchanged by evaporation of the solvent. Solutions of tetracyanoethylene tend to be highly colored. This is due to the fact that tetracyanoethylene enters readily into chemical associations and Lewis acid-Lewis base complex formation.

As will be seen from the following table, the 1:1 π complexes, which form immediately when tetracyanoethylene is dissolved in aromatic compounds, are visibly colored and show corresponding light absorption maxima. The unusually high stability of these complexes is evident from the high values of the equilibrium constant for the formation of the complexes.

TABLE

| π Complex of Tetracyanoethylene with— | Color | Wave Length of Maximum Light Absorption (A.) | Second Light Absorption Maximum, if present (A.) | Equilibrium Constant for Complex Formation (K) |
|---|---|---|---|---|
| Benzene | Bright yellow | 3,840 | | 2.00 |
| Toluene | Orange | 4,060 | | 3.70 |
| o-Xylene | Orange-red | 4,300 | | 6.97 |
| m-Xylene | do | 4,400 | | 6.00 |
| p-Xylene | do | 4,600 | 4,150 | 7.64 |
| Anisole | Wine-red | 5,070 | 3,840 | 4.42 |
| Fluorene | Violet | 5,700 | 4,160 | 18.0 |
| Pyrene | Deep blue | 7,240 | 4,950 | 29.5 |

The formation of these characteristically colored complexes, particularly when combined with measurement of the wave length of maximum light absorption, makes tetracyanoethylene highly useful as a rapid means for the detection and identification of aromatic compounds.

Tetracyanoethylene reacts vigorously with aqueous alkalies and amines. For example, aqueous ammonia or a 10% aqueous solution of sodium hydroxide cause an immediate exothermic reaction with the formation of a viscous polymeric material. Aniline reacts with tetracyanoethylene in aqueous ethanol to form a compound of formula $C_{11}H_6N_4$, which is believed to be

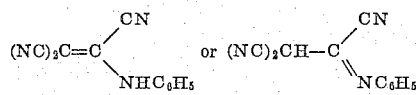

Tetracyanoethylene is capable of reacting with certain amines to form what can be generically described as C-tricyanovinylamines containing the characteristic grouping $(CN)_2C=C(CN)C$, the entering position for the tricyanovinyl group being determined by the structure of the amine. For example, tetracyanoethylene reacts with N-methylaniline to form a C-tricyanovinyl amine believed to have the structure

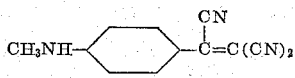

This compound is a crystalline, bright blue solid which dyes filter paper red. Numerous of these C-tricyanovinylamines are colored and have been found particularly substantive as dyes for "Orlon" acrylic fiber, and "Dacron" polyester fiber, producing strong permanent colors as applied to these synthetic fibers from neutral or acidic media. These C-tricyanovinylamines and their preparation are described in detail in application Serial No. 382,860, filed of even date herewith in the name of R. E. Heckert and entitled Preparation of Organic Compounds, now Patent No. 2,762,810.

The following examples in which all proportions are given by weight unless otherwise stated, illustrate the preparation of tetracyanoethylene (Example I), and its polymerization and copolymerization (Examples II–VII).

*Example I*

Seventy parts of sulfur monochloride was added slowly during the course of six hours to a refluxing solution of 33 parts of malononitrile in about 600 parts of chloroform. After the mixture was refluxed for an additional 20 hours, the chloroform was boiled off on a steam bath. An exothermic reaction, which deposited a crystalline solid on the walls of the container, occurred during the last stages of this operation. The residue was extracted exhaustively with diethyl ether in a Soxhlet extractor. On evaporation to dryness, the ether extract deposited 18 parts of crude tetracyanoethylene, which was purified by sublimation at 100° C. under reduced pressure (1 to 2 mm.). Analyses of a sample recrystallized from diethyl ether gave the following results.

*Analysis.*—Calcd. for $C_6N_4$: C, 56.3; N, 43.7; mol. wt., 128. Found: C, 56.45, 56.33; N, 43.23, 43.18; mol. wt., 132, 132.

The infrared spectrum of the product contained a divided band characteristic of conjugately unsaturated nitriles.

As indicated in the above example, tetracyanoethylene can be isolated from the reaction mixture after evaporation of the reaction diluent by extraction with a selective solvent such as diethyl ether. Tetracyanoethylene can also be isolated by sublimation; in fact, crystals of sublimated tetracyanoethylene are usually found on the walls of the container after evaporation of the diluent from the reaction mixture.

*Example II*

Two parts of tetracyanoethylene was placed in a polymerization tube, and the air was displaced with nitrogen. About 150 parts of ammonia was condensed in the tube, and the mixture was shaken to dissolve the tetracyanoethylene. The ammonia was removed by evaporation, and the polymeric residue was dried in vacuum at 70° C. The product obtained melted above 250° C. and was partly soluble in benzene and dimethylformamide. Elemental analysis showed the product to contain 49.96% nitrogen and to have a molecular weight of 650.

*Example III*

Twenty parts of tetracyanoethylene and 0.2 part of alpha,alpha' - azobis(alpha,gamma - dimethylvaleronitrile) were dissolved in 24 parts of distilled acrylonitrile in a polymerization tube. The air was displaced with nitrogen, and the tube was heated to 60° C.±1° C. in a constant temperature bath. After about 2 minutes, the previously homogeneous solution became cloudy. After 15 minutes, the mixture was still mobile, but after 30 minutes, it did not flow. In all, the reaction mixture was heated for about 2 hours. The polymer which formed was washed by suspending it in 79 parts of denatured alcohol, and the washed polymer was dried. The weight of the dry tetracyanoethylene/acrylonitrile copolymer was 15 parts. The polymer was purified by dissolving it in dimethylformamide and precipitating it three times with methanol, followed by drying at 56° C. in vacuo. The product analyzed: C, 66.99, 67.00; H, 5.72, 5.92; N, 26.03, 26.06. Calc'd for $C_3H_3N$: C, 67.9; H, 5.7; N, 26.4. Calc'd for $C_6N_4$: C, 56.3; N, 43.7.

(Infrared analysis showed an additional intensity of an infrared band in the nitrile region when the spectrum was compared with that of a sample of an unmodified polyacrylonitrile.)

*Example IV*

A steel pressure vessel was swept free of air with nitrogen and was charged with 1140 parts benzene, 50 parts tetracyanoethylene and 1 part di(tert.-butyl) peroxide. The reactor was closed, evacuated, placed in a shaker machine, and connected to a reservoir containing ethylene. Agitation was started, the temperature was brought to 135° C., and the pressure was adjusted to 950 atm. by addition of ethylene. The reactants were maintained at 135° C. and a pressure of 950 atm. for 9.5 hours. The reactor was then allowed to cool, opened and the product discharged. This product, which consisted of a brown solution, was subjected to distillation to remove the benzene. The residue that remained was then subjected to sublimation at 120° C. and a pressure of 0.1 mm. There was thus obtained as a non-volatile residue 10.0 parts of a dark brown tetracyanoethylene/ethylene copolymer. The polymer was soluble in dimethylformamide and acetone. This polymer analyzed as follows: 29.30% N, 907 molecular weight. From the nitrogen value it may be calculated that the copolymer contained 67.50% tetracyanoethylene by weight.

*Example V*

A steel pressure vessel was swept free of air with nitrogen and was charged with 570 parts benzene, 25 parts tetracyanoethylene, and 0.5 part di(tert.-butyl) peroxide. The reactor was closed, evacuated, placed in a shaker machine, and connected to a reservoir containing isobutylene. Agitation was started, the temperature was brought to 135° C., and the pressure was adjusted to 3000 atm. by injection of isobutylene. The reactants were maintained at 135° C. and a pressure of 3000 atm. for 4 hours. The reactor was then allowed to cool, opened, and the product discharged. This product, which consisted of a dark brown suspension, was subjected to distillation to remove the benzene. The residue that remained was then subjected to sublimation at 120° C. and a pressure of 0.1 mm. There was thus obtained as a non-volatile residue 22 parts of a black tetracyanoethylene/isobutylene copolymer. The polymer was soluble in dimethylformamide and acetone. This polymer analyzed as follows: 21.24% N, 562 molecular weight. From the nitrogen value it may be calculated that the copolymer contained 48.6% tetracyanoethylene by weight.

*Example VI*

A steel pressure vessel was swept free of air with nitrogen and was charged with 570 parts of benzene, 25 parts of tetracyanoethylene and 0.5 part di(tert.-butyl) peroxide. The reactor was closed, evacuated, placed in a shaker machine and connected to a reservoir containing propylene. Agitation was started, the temperature was brought to 135° C., and the pressure was adjusted to 3000 atm. by addition of propylene. The reactants were maintained at 135° C. and a pressure of 3000 atm. for 4 hours. The reactor was then allowed to cool, opened, and the product discharged. This product, which consisted of a black suspension, was subjected to distillation to remove the benzene. The residue that remained was then subjected to sublimation at 120° C. and a pressure of 0.1 mm. There was thus obtained as a non-volatile residue 27 parts of a black tetracyanoethylene/propylene copolymer. The polymer was soluble in dimethylformamide and acetone. This polymer analyzed as follows: 27.45% N, 614 molecular weight. From the nitrogen value it may be calculated that the copolymer contained 62.8% tetracyanoethylene by weight.

Example VII

A glass vessel was swept free of air with nitrogen and was charged with 51.2 parts of tetracyanoethylene and 454 parts of styrene. The resulting solution was heated at 155° C. to 175° C. for 22 hours to effect polymerization. The asphalt-like product was dissolved in 1760 parts of benzene, and the brown tetracyanoethylene/styrene copolymer was precipitated in 7930 parts of methyl alcohol. The copolymer was recovered by filtration and when dried weighed 360 parts. Analysis showed carbon, 88.51%; hydrogen, 7.07%; nitrogen, 3.66%; mol. wt., 2090. Based on the nitrogen analysis this corresponds to 8.73% tetracyanoethylene in the copolymer.

It is to be understood that the above examples are merely illustrative and that numerous embodiments of the invention will be apparent to those skilled in the art. For instance, it is not necessary to employ the specific polymerization catalysts employed in Examples III, IV, V and VI to effect the polymerization of tetracyanoethylene, since other azo compounds, and other free-radical generating substances can be employed for this purpose.

Both tetracyanoethylene and its polymers are ready sources of hydrogen cyanide and as such are highly useful as insecticides. When heated in the presence of moist alkali as in processes adaptable for fumigation, tetracyanoethylene and its polymers generate hydrogen cyanide. When deposited from suspension in an alkaline medium (pH 7 to 9) as by spraying on living plants or in insect nests, tetracyanoethylene and its polymers decompose slowly and give off hydrogen cyanide, thereby serving as effective insect poisons for extended periods of time.

The polymers and copolymers of tetracyanoethylene are useful as coating compositions when deposited from solution in suitable organic solvents. The high softening characteristics of the polymers make the polymers particularly useful for motor coil and transformer wire insulation, where improved electrical efficiency results from the capacity of the motor or transformer to be operated at higher temperatures than those permissible with ordinary polymer insulation coatings.

As many apparently widely different embodiments of this invention may be made without departing from the spirit and scope thereof, it is to be understood that the invention is not limited to the specific embodiments thereof except as defined in the appended claims.

The invention claimed is:
1. Tetracyanoethylene.
2. White crystalline monomeric tetracyanoethylene characterized (1) by melting within the range of 195–200° C. in a sealed tube, (2) by being sublimable in air at 120–150° C., (3) by having an infrared absorption spectrum with a divided band characteristic of conjugated unsaturated nitriles, and (4) by formation with toluene of an orange-colored 1:1 complex having a light absorption maximum at 4060 A. when dissolved therein.

References Cited in the file of this patent
UNITED STATES PATENTS

| | | |
|---|---|---|
| 2,264,354 | Alder et al. | Dec. 2, 1941 |
| 2,466,395 | Dickey | Apr. 5, 1949 |

OTHER REFERENCES

Naik: J. Chem. Soc. (London), vol. 119, part 2, p. 1239 (1921).

Urushibara: Beilstein (Handbuch, 4th ed., 2nd suppl.), vol. II, p. 714 (1942).